John Aiken's "Harrow"

No. 72260 — Patented Dec 17 1867

Witnesses:
Theo. Tusche
Wr. Trewin

Inventor:
Jno Aiken
Per Munn & Co.
Attorneys

UNITED STATES PATENT OFFICE.

JOHN AIKEN, OF WARNER, NEW HAMPSHIRE.

IMPROVEMENT IN HARROWS.

Specification forming part of Letters Patent No. 72,260, dated December 17, 1867.

*To all whom it may concern:*

Be it known that I, JOHN AIKEN, of Warner, in the county of Merrimack and State of New Hampshire, have invented a new and Improved Harrow; and I do hereby declare that the following is a full, clear, and exact description thereof, which will enable others skilled in the art to make and use the same, reference being had to the accompanying drawings, forming part of this specification, in which—

Figure 1:
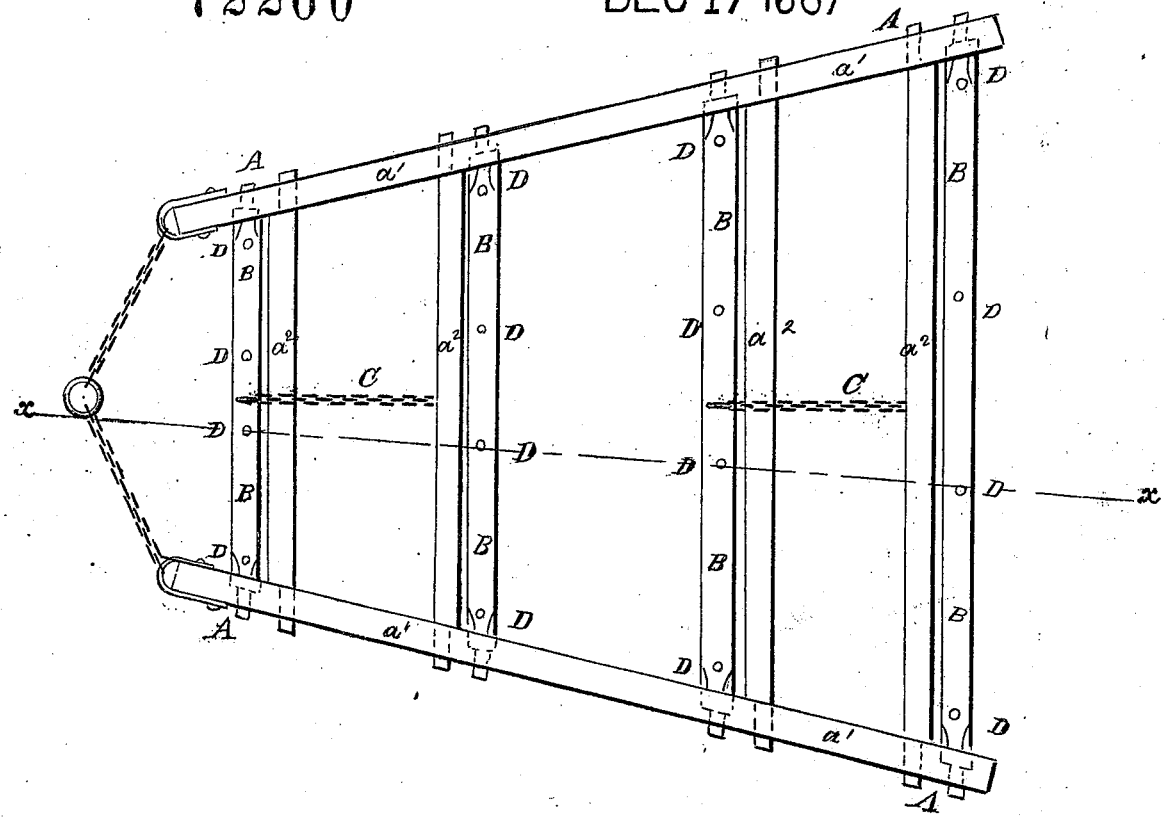
Figure 2:
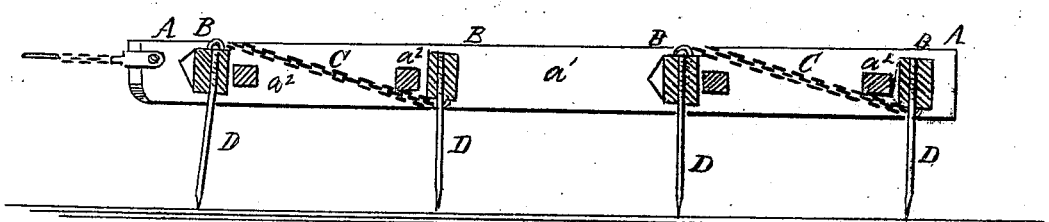

Figure 1 is a top view of my improved harrow. Fig. 2 is a vertical longitudinal section of the same, taken through the line $xx$, Fig. 1.

Similar letters of reference indicate corresponding parts.

My invention has for its object to furnish an improved harrow so constructed and arranged that it will adjust itself to pass over roots, stones, or other obstructions without having to be raised from the ground; that it will relieve itself of rubbish, and that it may be made light, while at the same time it will do its work better than the ordinary heavy harrows; and it consists in the construction of the frame and rollers and in the manner in which the teeth are constructed and attached to the rollers.

A is the frame of the harrow, consisting of two inclined side bars, $a'$, connected to each other by four or more cross-bars, $a^2$, as shown in Fig. 1.

B are rollers the ends of which are pivoted to the inclined side bars, $a'$, of the frame A, and which I prefer to arrange in pairs, each pair of rollers B having two cross-bars, $a^2$, between them. The rollers of each pair are connected to each other by a chain or chains, C, or other equivalent flexible or jointed connection, of such a length that it will be taut when the harrow-teeth are in a vertical position, so that when the teeth of either roller are inclined backward by encountering an obstruction the teeth of the other roller will be drawn or made to incline forward. The forward end of the chains C are connected to the upper side of the forward roller, and their rear ends are connected to the lower side of the rear roller of each pair, as shown in Figs. 1 and 2, said chains passing above the forward one and below the rear one of each pair of cross-bars $a^2$.

D are the teeth of the harrow, which are made of three-fourth-inch round iron, and the upper ends of which are screwed into the rollers B. This enables the teeth D as they become worn sharp upon one side by being drawn over the stones while being inclined backward to be turned half-round, so as to be worn in turn upon the other side, making the teeth self-sharpening.

In using the harrow, as the teeth of the forward roller of each pair come in contact with a root, stone, or other obstruction, they are drawn or inclined rearward, so as to be easily drawn over said obstruction without being raised from the ground. As soon as the teeth of the forward roller have passed the obstruction, the teeth of the rear roller encounter it, and are in turn drawn or made to incline rearward, so that they may be drawn over it, thus keeping the harrow at all times close to the ground, so that no part of the surface of the ground may be left unharrowed, as is always the case when an ordinary harrow is raised to enable it to pass over an obstruction.

I claim as new and desire to secure by Letters Patent—

Connecting the rollers B to each other in pairs by chains C or equivalent flexible or jointed connections, substantially as herein shown and described, and for the purpose set forth.

The above specification of my invention signed by me this 4th day of September, 1867.

JOHN AIKEN.

Witnesses:
ELIZA J. DAVIS,
SAML. DAVIS.